(12) United States Patent
Whitaker

(10) Patent No.: US 6,273,654 B1
(45) Date of Patent: Aug. 14, 2001

(54) CARGO HOLDING DEVICE

(76) Inventor: Regina M. Whitaker, 2613 Pin Oak La., Arlington, TX (US) 76012

( * ) Notice: Subject to any disclaimer, the term of this patent is extended or adjusted under 35 U.S.C. 154(b) by 0 days.

(21) Appl. No.: 09/572,956

(22) Filed: May 18, 2000

(51) Int. Cl.$^7$ .................................................... B60P 7/08
(52) U.S. Cl. ......................... 410/116; 410/97; 410/101; 410/106
(58) Field of Search ............................. 410/101, 97, 106, 410/116, 110; 24/129 B, 115 K; 248/499

(56) References Cited

U.S. PATENT DOCUMENTS

| | | | |
|---|---|---|---|
| 3,685,778 | * | 8/1972 | Berns ..................................... 410/116 |
| 4,253,594 | * | 3/1981 | Parks ................................. 410/101 X |
| 4,954,031 | * | 9/1990 | Geeck, III ............................. 410/110 |
| 5,011,349 | * | 4/1991 | McAndrews ...................... 410/106 X |
| 5,180,263 | * | 1/1993 | Flowers, Jr. ........................... 410/106 |
| 5,326,203 | * | 7/1994 | Cockrell ................................ 410/110 |
| 5,553,981 | * | 9/1996 | Braden .................................. 410/116 |
| 5,641,254 | * | 6/1997 | Sullivan ........................... 410/116 X |
| 5,800,106 | * | 9/1998 | Miller ................................. 410/97 X |
| 5,971,683 | * | 10/1999 | Hunt ..................................... 410/106 |
| 6,039,520 | * | 3/2000 | Cheng ................................... 410/106 |
| 6,113,328 | * | 9/2000 | Claucherty ............................ 410/106 |
| 6,146,069 | * | 11/2000 | Elwell et al. ......................... 410/106 |

* cited by examiner

Primary Examiner—Stephen T. Gordon
(74) Attorney, Agent, or Firm—John E. Vandigriff

(57) ABSTRACT

A portable cargo tie-won device includes at least a plate and a tie line is used to secure cargo in the bed of a truck. The plate is placed under the front of the truck bed and back of the truck cab with a tie line such as a cable, rope, or other tie down device extending up between the truck bed and cab, over the bed wall and attached to the cargo. The tie-down device may be of metal or plastic, and may include a magnetic material, or magnets, to magnetically attach it to the under side of the truck.

15 Claims, 3 Drawing Sheets

CARGO HOLDING DEVICE

FIELD OF THE INVENTION

The invention relates to a device for securing cargo on a truck or other carrier, and more specifically to a plate that is attached to a rope, strap, or other securing cable and is placed under the cab and bed of a truck to secure cargo on the truck bed.

BACKGROUND OF THE INVENTION

Various tie-downs have been used to secure cargo on the beds of trucks. In U.S. Pat. No. 1,835,615, utilizes a rope and cinch device to tighten and secure cargo to a flat bed truck.

Tie-down straps are commonly used by fastening each end under the edge of the truck, with the straps positioned over the cargo. Similar tie-down straps are illustrated in U.S. Pat. Nos. 3,697,045 and 4,382,736. In each of these patents, the tie-down straps are secured to one side of the truck bed, positioned over the cargo, and then attached to and tightened by a winch on the opposite side of the truck bed. U.S. Pat. No. 5,791,844 shows a similar apparatus for securing cargo to a flat bed trailer wherein each which has a crank handle to wind and tighten the straps on all the winches.

Each of the prior art tie-down straps are permanently attached to the cargo bed of the truck or trailer, and are not useful for temporary and storable cargo tie-downs for use with pickup trucks.

SUMMARY OF THE INVENTION

The invention is a portable cargo tie-down device that is placed under the front of the truck bed and back of the truck cab with a cable, rope, or other tie down extending up between the truck bed and cab, over the bed wall and attached to the cargo. The tie-down device may be of metal or plastic, and may include a magnetic material, or magnets, to magnetically attach it to the under side of the truck. The tie-down may also be positioned under the back of the truck bed with the cable or rope extending up between the bumper and truck bed, and over the tail gate to secure cargo in the truck bed.

BRIEF DESCRIPTIONS OF THE DRAWINGS

DESCRIPTION OF A PREFERRED EMBODIMENT

Figure 1:
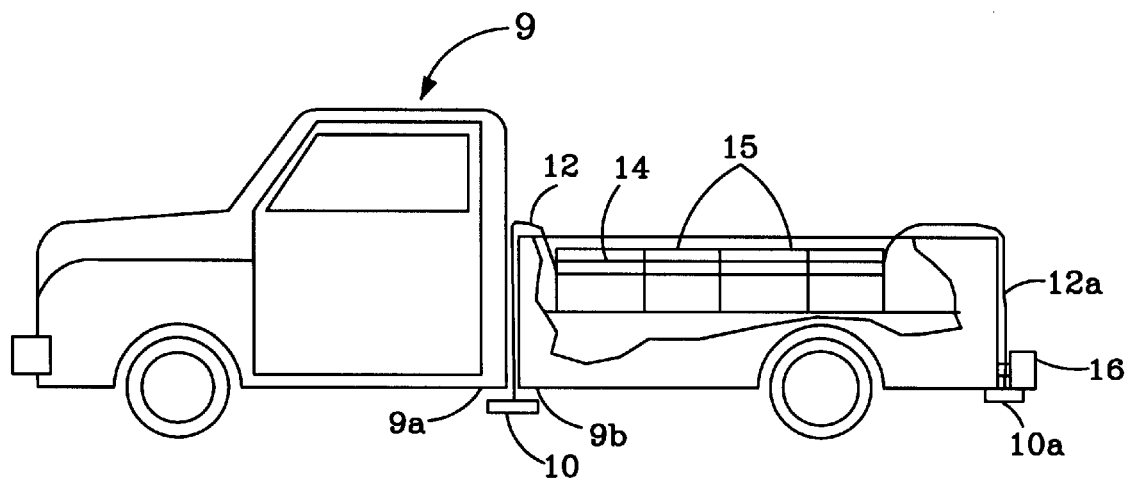
FIG. 1 shows a truck with a portable tie-down device according to the present invention.

FIG. 1 illustrates an example of the use of the tie-down device according to the invention. A truck 9, has cargo 15 secure together by a strap 14, which is held in position by a first portable tie-down device 10 and a second tie-down device 10a. Tie-down device 10 is attached to a rope or strap 12 that is positioned between the truck cab 9a and truck bed 9b, and secured to strap 14. Tie-down device 10 is pulled up against the bottom of cab 9a and bed 9b. Similarly, tie-down device 10a is under truck bed 9b and bumper 16, and is attached to a one end of strap 12a which is attached to the cargo 15 on the other end. FIG. 1 illustrates only one possible use of tie-down device 10, other configurations may be used.

Figure 2:
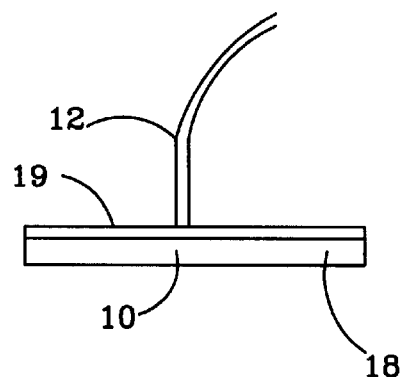
FIG. 2 shows a basic tie-down device according to the invention.

FIG. 2 shows a basic tie-down device 10 having a base 18 with a non-skid coating or layer 19. A non-skid coating is useful in preventing the tie-down device from moving around or slipping under the bed and cab body. Layer 19 may also be a plastic-magnetic material to hold the tie-down device to the truck before the rope or cord 12 is secured to the cargo. Base 18 may be a high impact plastic or may be metal. The rope or cord 12 may be attached to tie-down 10 by inserting it in a hole centrally located in base 18, or may be inserted in an eyelet secured to tie-down 10. Also, the rope or cord may be a ratchet tie-down strap that is often used to strap items to gather and to strap them to eyelets on the top edge of a truck bed.

Figure 3:
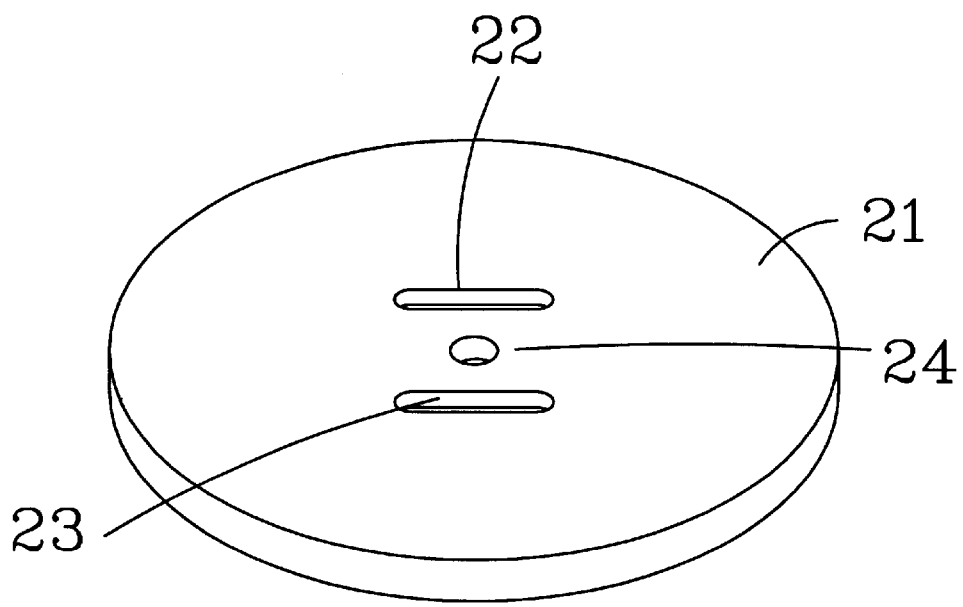
FIG. 3 is an isometric top view of a tie-down device.

FIG. 3 is a top isometric view of tie-down device 21 that may be, for example, a molded plastic disk with a central opening 24 through which a rope or other cord may be secured to attached to cargo as illustrated in FIG. 1. Tie-down 21 also has a pair of openings 22 and 23 that extend through tie-down 20. The use of openings 22 and 23 are for inserting a hook illustrated in FIG. 6) attached to a rope or ratchet tie down for securing cargo on a truck bed.

Figure 4:
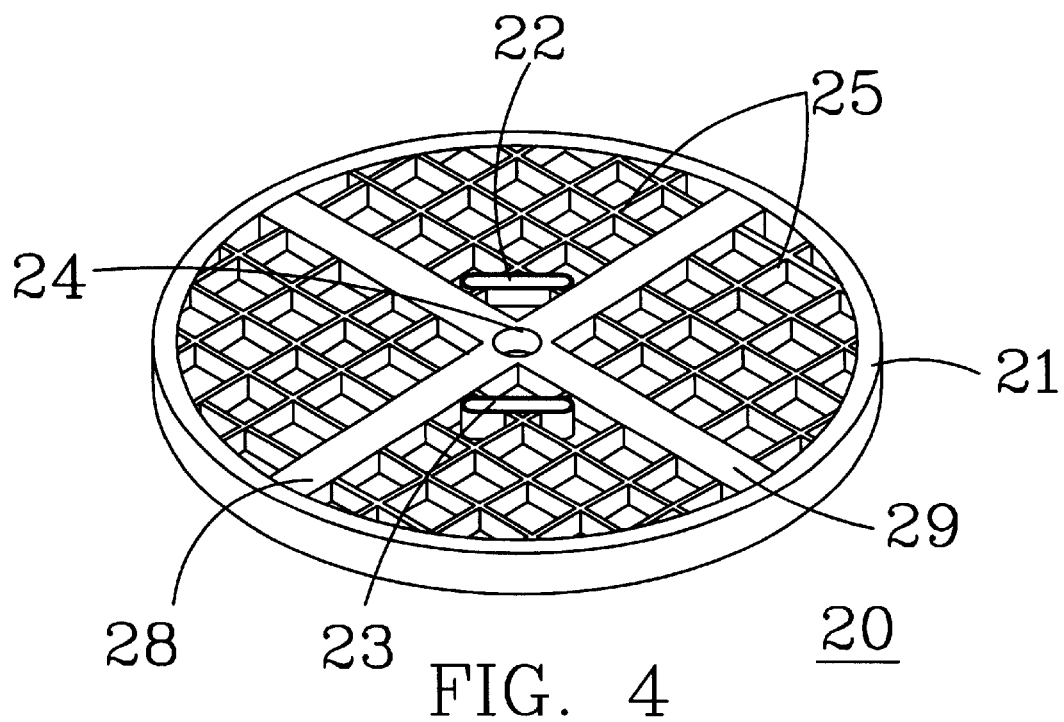
FIG. 4 is a bottom view of the tie-down of FIG. 3.

FIG. 4 is a bottom view of the tie-down of FIG. 3. Tie-down 20, in this embodiment is a molded disk with a re-enforcing web 25 molded into the disk. There are two crossed re-enforcing bars 28 and 29 which may be, for example, re-enforcing plastic or metal. If the bars are metal, they may be magnetized to secure the tie-down under the truck when the rope or cord is not attached to any cargo. This allows a person to secure the cargo without having to pull, to hold the die-downs up against the under side of the truck. Openings 22 and 23 are shown with re-enforced sides.

Figure 5:
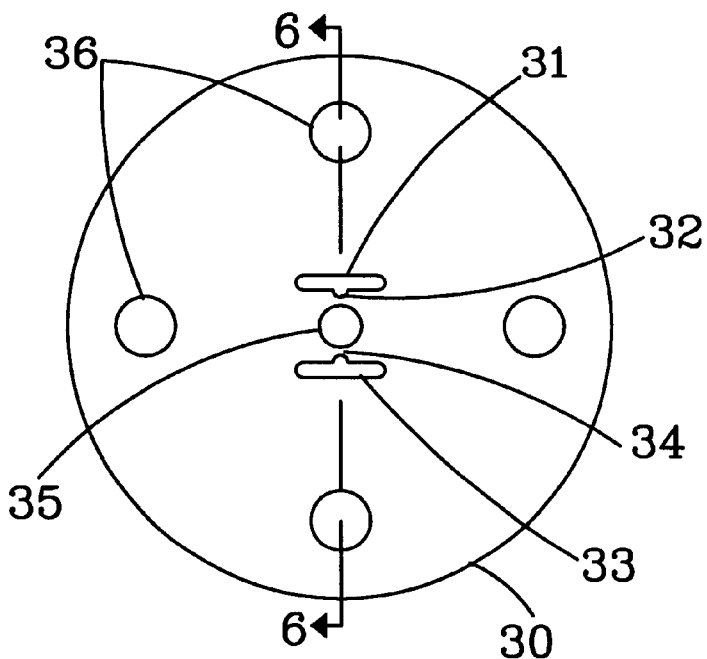
FIG. 5 is a top view of another embodiment of the tie-down device.

FIG. 5 is a top view of tie-down device 30 which may be made, for example of plastic, and may have a plurality of magnets 36 embedded in the top of the tie-down device. The openings 31 and 33 each have a notch 32 and 34, respectively, that are used for holding a hook inserted into openings 31 and 33 in a fixed position. Opening 35 may be used to attach tie-town 30 to a rope, cord or equivalent device.

Figure 6:
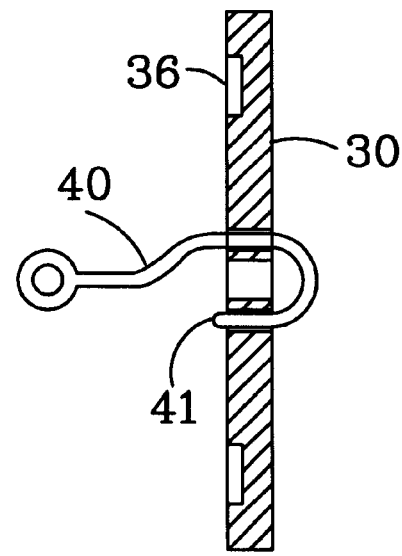
FIG. 6 is a cross-section view of the tie-down device of FIG. 5.

FIG. 6 is a cross-section view taken through section 6—6 of FIG. 5. Tie-down device 30 is shown with a hook 40 in openings 31 and 33. Hook 40 is aligned with one of the opening 32 inserted and then rotated so that end 41 of hook 40 can be pulled upward in to opening 33. The hook 40 and end 41 are aligned with notches 32 and 34 as it is pulled upward to hold hook 40 in position in the openings 31 and 33.

Figure 7:
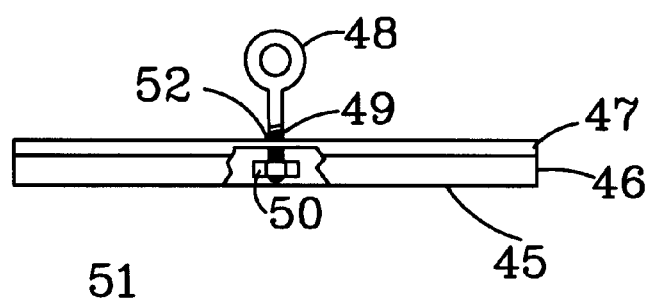
FIG. 7 is an edge view of a tie-down device using an eyelet bolt.

FIG. 7 is a side view of tie-down device 51 showing a base 45 and a non-skid layer 47. Layer 47 may be of a plastic magnetic material. An eyelet bolt 48 is attached through center hole 52 of tie-down 51 and secured therein by threads 49 and nut 50.

What is claimed is:

1. A portable tie-down system for use with pickup trucks, comprising:

a plate which is positioned under a pickup truck between the cab and truck bed;

a tie line including a first end for attaching to said plate and a second end for attaching to cargo in a pickup truck bed, said tie line extending upward between the truck bed and cab; and an opening in said plate for securing the first end of said tie line.

2. The portable tie-down system according to claim 1, wherein said plate includes a non-skid material on one surface.

3. The portable tie-down system according to claim 1, wherein said plate includes at least one re-enforcing member in said plate.

4. The portable tie-down system according to claim 1, including two openings for attaching a hook end of a ratchet strap.

5. The portable tie-down system according to claim 4, wherein at least one of the openings for attaching a hook end is an elongated opening for inserting the hook end through the tie-down device plate.

6. The portable tie-down system according to claim 1, including a re-enforcing web structure to provide strength to the plate.

7. The portable tie-down system according to claim 1, wherein said opening is a central opening for attaching the tie-line.

8. A portable tie-down system for use with pickup trucks by placing the tie-down device under a portion of the truck cab and truck bed, comprising:

a plate, having a first surface, that is placed under the truck cab and bed;

a tie line extending upward from said plate between said truck cab and bed, said tie line including a first end for attaching to said plate and a second end for attaching to cargo in a pickup truck bed; and an opening in said plate for securing said tie line.

9. The portable tie-down system according to claim 8, wherein said plate includes a non-skid magnetic material on one surface.

10. The portable tie-down system according to claim 8, wherein said plate includes at least one re-enforcing member in said plate.

11. The portable tie-down system according to claim 8, including two openings for attaching a hook end of a ratchet strap.

12. The portable tie-down system according to claim 11, wherein at least one of the openings for attaching a hook end is an elongated opening for inserting the hook end through the tie-down device plate.

13. The portable tie-down system according to claim 8, including a re-enforcing web structure to provide strength to the plate.

14. The portable tie-down system according to claim 8, wherein said opening is a central opening for attaching the tie-line.

15. The portable tie-down system according to claim 8, including at least two magnets embedded in the first surface of the plate, for magnetically attaching the plate to the under side of the truck cab and bed.

* * * * *